United States Patent
Eberlein et al.

(10) Patent No.: US 9,673,744 B2
(45) Date of Patent: Jun. 6, 2017

(54) OPERATING STATE CIRCUIT FOR INVERTER AND METHOD FOR SETTING OPERATING STATES OF AN INVERTER

(75) Inventors: Edwin Eberlein, Stuttgart (DE); Andreas Schoenknecht, Renningen (DE); Daniel Raichle, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/239,428

(22) PCT Filed: Jun. 12, 2012

(86) PCT No.: PCT/EP2012/061093
§ 371 (c)(1),
(2), (4) Date: Feb. 18, 2014

(87) PCT Pub. No.: WO2013/023807
PCT Pub. Date: Feb. 21, 2013

(65) Prior Publication Data
US 2014/0191700 A1 Jul. 10, 2014

(30) Foreign Application Priority Data
Aug. 18, 2011 (DE) .......... 10 2011 081 173

(51) Int. Cl.
*H02P 1/00* (2006.01)
*H02P 1/28* (2006.01)
(Continued)

(52) U.S. Cl.
CPC ............ *H02P 27/06* (2013.01); *B60L 3/0061* (2013.01); *H02H 7/08* (2013.01); *H02P 6/182* (2013.01);
(Continued)

(58) Field of Classification Search
CPC ......... B60L 3/0061; H02H 7/08; H02P 27/06; H02P 29/021; H02P 6/182
(Continued)

(56) References Cited

U.S. PATENT DOCUMENTS

| 5,929,578 A | 7/1999 | Atarashi |
| 6,239,566 B1 * | 5/2001 | Tareilus ............... H02H 7/0833 318/379 |

(Continued)

FOREIGN PATENT DOCUMENTS

| DE | 19518991 | 1/1997 |
| DE | 19835576 | 11/1999 |

(Continued)

OTHER PUBLICATIONS

International Search Report for Application No. PCT/EP2012/061093 dated May 24, 2013 (English Translation, 3 pages).

*Primary Examiner* — Kawing Chan
*Assistant Examiner* — Bradley Brown
(74) *Attorney, Agent, or Firm* — Michael Best & Friedrich LLP

(57) ABSTRACT

The invention relates to an operating state circuit for actuating an inverter (3), which supplies an n-phase electrical machine (5) with an n-phase supply voltage via phase connections (4a, 4b, 4c), wherein n≥1, comprising an evaluation device (6) which is connected to the phase connections (4a, 4b, 4c) of the inverter (3) and which is configured to detect output voltages of the inverter (3) to the phase connections (4a, 4b, 4c) and to determine a speed of the electrical machine (5) on the basis of the detected output voltages, and an actuating device (7) which is coupled to the evaluation device (6) and which is configured to switch to an idle state or an active short-circuit in dependence on the determined speed of the inverter (3).

9 Claims, 2 Drawing Sheets

(51) Int. Cl.
| | |
|---|---|
| *H02P 3/00* | (2006.01) |
| *H02P 7/06* | (2006.01) |
| *H02P 7/14* | (2006.01) |
| *H02P 23/00* | (2016.01) |
| *H02P 25/00* | (2006.01) |
| *H02P 27/00* | (2006.01) |
| *H02P 27/06* | (2006.01) |
| *B60L 3/00* | (2006.01) |
| *H02H 7/08* | (2006.01) |
| *H02P 6/182* | (2016.01) |
| *H02P 29/024* | (2016.01) |
| *H02M 1/32* | (2007.01) |
| *H02P 3/22* | (2006.01) |

(52) U.S. Cl.
CPC ......... H02P 29/0241 (2016.02); *H02M 1/32* (2013.01); *H02P 3/22* (2013.01); *H02P 2207/05* (2013.01); *Y02T 10/642* (2013.01)

(58) Field of Classification Search
USPC ........................................................ 318/504
See application file for complete search history.

(56) References Cited

U.S. PATENT DOCUMENTS

| | | | |
|---|---|---|---|
| 7,279,862 B1* | 10/2007 | Welchko ............... | B60L 3/0061 318/563 |
| RE42,200 E * | 3/2011 | Welchko ............... | B60L 3/0061 318/563 |
| 2007/0013330 A1* | 1/2007 | Noh ......................... | H02P 6/15 318/400.03 |
| 2007/0120519 A1* | 5/2007 | Sakamoto et al. ............ | 318/722 |
| 2009/0099703 A1 | 4/2009 | Rehm et al. | |
| 2010/0019710 A1* | 1/2010 | Schwarzkopf .......... | H02P 6/182 318/400.35 |
| 2010/0202089 A1* | 8/2010 | Kuehner ............... | B60L 3/0023 361/30 |
| 2012/0249155 A1* | 10/2012 | Bruckhaus ............... | B60L 3/04 324/537 |
| 2012/0306417 A1 | 12/2012 | Schwarz et al. | |

FOREIGN PATENT DOCUMENTS

| | | |
|---|---|---|
| DE | 102005046962 | 4/2007 |
| DE | 102006003254 | 7/2007 |
| DE | 102007020509 | 11/2008 |
| EP | 0935336 | 8/1999 |

* cited by examiner

OPERATING STATE CIRCUIT FOR INVERTER AND METHOD FOR SETTING OPERATING STATES OF AN INVERTER

BACKGROUND OF THE INVENTION

The invention relates to an operating state circuit for an inverter and to a method for setting operating states of an inverter, in particular for an inverter for supplying power to a synchronous machine.

Electric drives of hybrid or electric vehicles can have permanent magnet electric machines, in particular synchronous machines, to which AC voltage is supplied by means of a pulse-controlled inverter. In this case, in the event of fault states on the low-voltage side, for example in the event of failure of the electronic driving, the power supply, various sensors, data communication or a fuse, it may be necessary to set a safe state in the inverter, i.e. a switching state of the inverter in which safety for people accessing the vehicle, such as rescue services in the event of an accident, and for the integrity of the electrical system is still ensured.

Document DE 10 2009 047 616 A1 discloses an inverter circuit for an electric machine which, in the event of a fault, can be transferred from the operating state of an active short circuit into the operating state of freewheeling.

SUMMARY OF THE INVENTION

In accordance with one aspect, the present invention provides an operating state circuit for driving an inverter, which supplies an n-phase supply voltage to an n-phase electric machine via phase connections, where n≥1, comprising an evaluation device, which is connected to the phase connections of the inverter and which is designed to detect output voltages of the inverter at the phase connections and to determine a speed of the electric machine on the basis of the detected output voltages, and a drive device, which is coupled to the evaluation device and which is designed to switch the inverter into a freewheeling state or into an active short circuit in dependence on the determined speed.

In accordance with a further aspect, the invention provides an inverter arrangement for supplying an n-phase supply voltage to an n-phase electric machine, where n≥1, comprising a DC voltage intermediate circuit, to which a DC voltage is supplied from a high-voltage source, an inverter comprising a multiplicity of switching devices, which is connected to the DC voltage intermediate circuit and is designed to provide an n-phase supply voltage at phase connections, an operating state circuit according to the invention, which is designed to drive the multiplicity of switching devices of the inverter for setting a freewheeling state or an active short circuit, and an energy supply device, which is coupled to the DC voltage intermediate circuit and which is designed to supply electrical energy from the DC voltage intermediate circuit to the evaluation device and the drive device.

In accordance with a further aspect, the present invention provides a method for setting operating states of an inverter, which supplies an n-phase supply voltage to an n-phase electric machine via phase connections, where n≥1, comprising the steps of detecting output voltages at the phase connections of the inverter, determining a speed of the electric machine on the basis of the detected output voltages, driving switching devices of the inverter for setting a freewheeling state when the determined speed is less than a predetermined speed threshold value, and driving switching devices of the inverter for setting an active short circuit when the determined speed is greater than or equal to the predetermined speed threshold value.

One concept of the present invention consists in determining, independently of detection of the position of the rotor of an electric machine, in particular a synchronous machine, by position encoders, a rotor frequency via the evaluation of the field emf present at the phase connections of the inverter,. As a result, a decision can be taken on the selection of a safe operating state for the inverter depending on the rotor frequency or a speed of the synchronous machine.

A further concept of the present invention consists in selecting between two different operating states which can avoid speed-dependent disadvantages during driving of the inverter. By setting a freewheeling state of the inverter at low speeds, on the one hand, it is possible to avoid the occurrence of a high braking torque on the shaft of the electric machine. By setting an active short circuit at high speeds, on the other hand, it is possible to avoid an increase in the intermediate circuit voltage and the occurrence of high charge currents, which otherwise could result in damage to the power electronics and/or the high-voltage energy source.

In an advantageous embodiment, the drive device can be designed to switch the inverter into a freewheeling state when the determined speed is less than a predetermined speed threshold value and to switch the inverter into an active short circuit when the determined speed is greater than or equal to the predetermined speed threshold value. In this way, the safety of the electric machine and the drive electronics can be optimized.

In an advantageous embodiment, the evaluation device can be designed to detect the field emf of the electric machine. This enables a direct correlation between the detected field emf and the instantaneous speed of the electric machine.

In accordance with an advantageous embodiment, the drive device can be designed to switch the switching devices of the inverter into a freewheeling mode for a predetermined time period when the DC voltage in the DC voltage intermediate circuit falls below an intermediate circuit threshold value. Since the drive device of an inverter arrangement according to the invention is fed via the energy supply device from the high-voltage side of the inverter arrangement, the operating state circuit can so to speak supply itself with energy by virtue of the inverter being switched into the freewheeling state for a short time, as a result of which the induced field emf is fed back into the DC voltage intermediate circuit via the diodes of the switching devices of the inverter.

In accordance with an advantageous embodiment of the method according to the invention, this is implemented only when a fault state of the electric machine is detected. The method for driving an inverter is therefore implemented only when the actual normal operation of the inverter is disrupted by a defect or a fault of a component of the electric machine or the drive elements thereof.

BRIEF DESCRIPTION OF THE DRAWINGS

Further features and advantages of embodiments of the invention are detailed in the description below with reference to the attached drawings.

DETAILED DESCRIPTION

Figure 1:
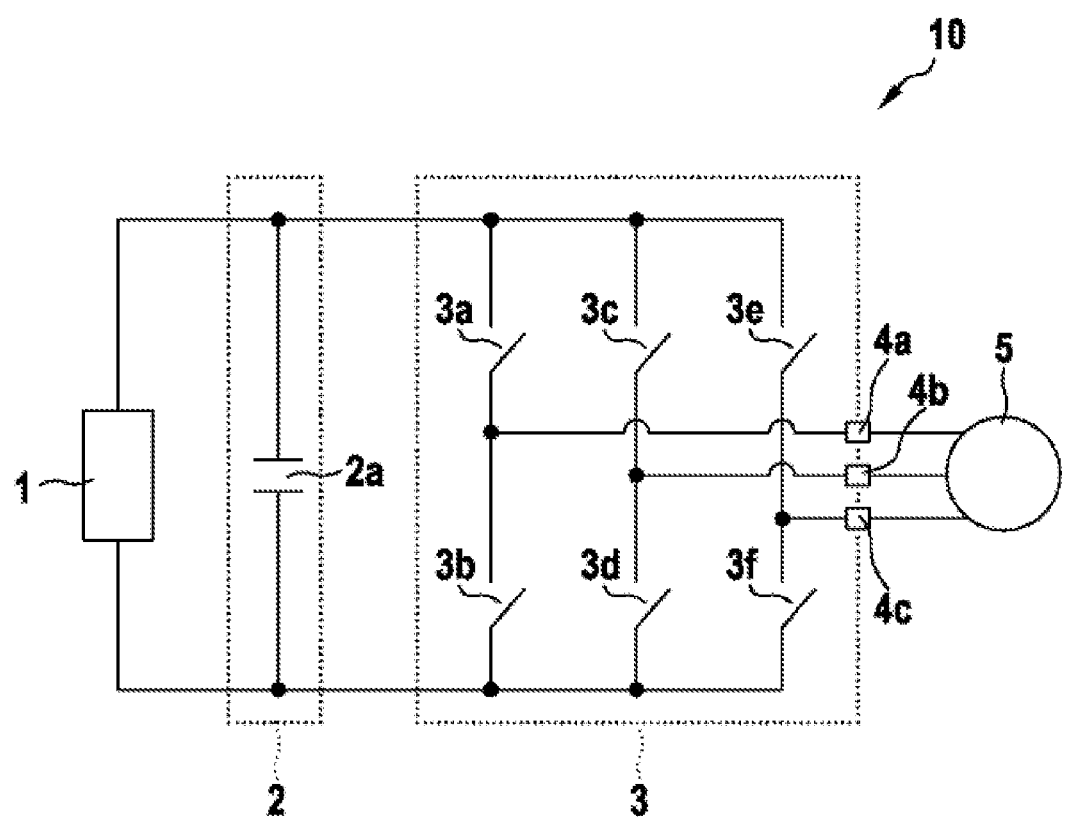
FIG. 1 shows a schematic illustration of an inverter arrangement.

Identical and functionally identical elements, features and components, where no details are given to the contrary, are each provided with the same reference symbols in the figures. It goes without saying that components and elements are not necessarily reproduced true to scale in the drawings, for reasons of clarity.

Further possible configurations and developments and implementations of the invention also include combinations which are not explicitly mentioned of features of the invention which are described above or in the text which follows.

FIG. 1 shows a schematic illustration of an inverter arrangement 10 for operating an electric machine 5. The inverter arrangement comprises a high-voltage energy source 1, such as, for example, a traction battery of an electrically operated vehicle and also a DC voltage intermediate circuit 2 and an inverter 3. The electric machine 5 can be a synchronous machine 5 or a synchronous motor 5, for example.

The DC voltage intermediate circuit 2 can have, for example, an intermediate circuit capacitance 2a, which can be used for buffer-storing electrical energy from the high-voltage energy source 1. An inverter 3, for example a pulse-controlled inverter circuit, can be connected to the output connections of the DC voltage intermediate circuit 2. In the present example shown in FIG. 1, the inverter 3 is in the form of a full-bridge circuit or B6 bridge. For this, the inverter 3 comprises upper half-bridge branches with switching devices 3a, 3c, 3e on the high-voltage side and lower half-bridge branches with switching devices 3b, 3d, 3f on the low-voltage side. The switching devices 3a to 3f can each have power semiconductor switches, for example. The switching devices 3a to 3f can have, for example, field-effect transistor switches such as n-MOSFETs (n-conducting metal oxide semiconductor field-effect transistors, enhancement type), JFETs (junction field-effect transistors) or p-MOSFETs (p-conducting metal oxide semiconductor field-effect transistors). The switching devices 3a to 3f can also have IGBTs (insulated gate bipolar transistors).

The inverter 3 can, by corresponding driving of the switching devices 3a to 3f, generate a three-phase AC voltage for driving the electric machine 5. For this, a corresponding phase voltage is generated at the respective phase connections 4a, 4b, 4c of the inverter 3. In the example illustrated in FIG. 1, three phase connections and a B6 bridge are shown, wherein any other number of phase connections with a corresponding number of half-bridge branches is likewise possible.

Figure 2:
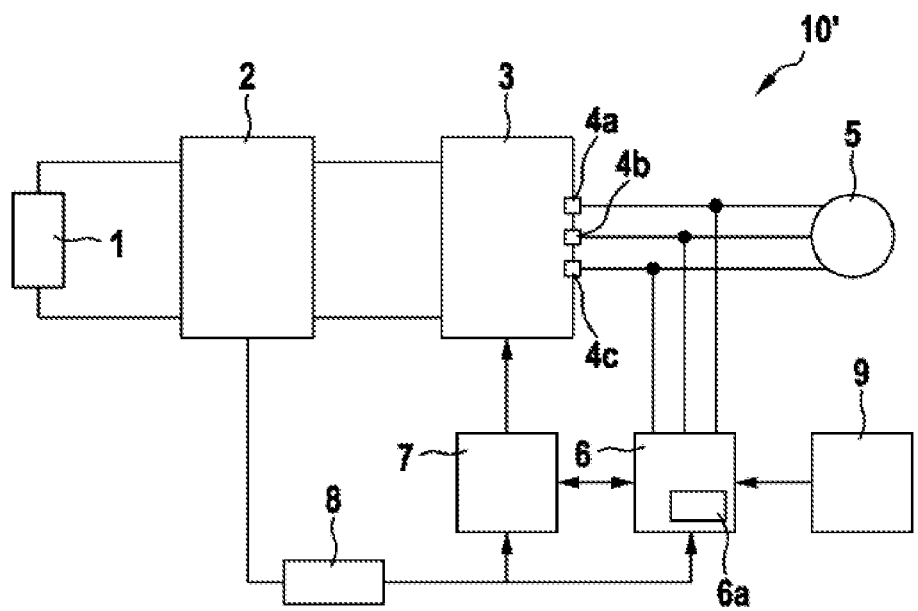
FIG. 2 shows a schematic illustration of an inverter arrangement in accordance with a further embodiment of the invention.

FIG. 2 shows an inverter arrangement 10', which can have the features of the inverter arrangement 10. In particular, FIG. 2 shows a high-voltage energy source 1, a DC voltage intermediate circuit 2 and an inverter 3, which can be configured in a similar manner to that shown in FIG. 1 and can be coupled to one another. In this case, the inverter 3 can be designed to provide phase voltages at the phase connections 4a, 4b, 4c for operating an electric machine 5.

The inverter arrangement 10' furthermore comprises an energy supply device 8, a drive device 7 and an evaluation device 6. Electrical energy can be supplied to the drive device 7 and the evaluation device 6 by the energy supply device 8, which is coupled to the DC voltage intermediate circuit 2, from the high-voltage side of the inverter 3. In addition, a low-voltage energy supply device 9 can be provided, which supplies electrical energy to the evaluation device 6 from the low-voltage side of the inverter 3.

The energy supply device 8 can comprise, for example, a step-down converter, which converts a high voltage present at the DC voltage intermediate circuit 2 into a lower supply voltage for the drive device 7 and the evaluation device 6. The energy supply device 8 can in this case be designed to provide the energy supply to the drive device 7 and the evaluation device 6 only when the low-voltage energy supply device 9 has failed or another fault state has occurred on the low-voltage side of the inverter.

The evaluation device 6 is connected to the phase connections 4a, 4b, 4c of the inverter 3 and can be designed to detect output voltages of the inverter 3. In particular, the evaluation device 6 can be designed to detect induced field emfs in the electric machine 5. The evaluation device 6 can comprise, for example, a microcontroller 6a, which converts the field emf into an instantaneous speed or rotor frequency of the electric machine 5.

Depending on the determined speed, the drive device 7 can then drive the switching devices of the inverter 3 in such a way that, in the event of a fault state on the low-voltage side of the inverter, for example in the event of failure of the microcontroller for the torque-setting path, in the event of failure of the position encoder of the electric machine, in the event of failure of the current sensing, in the event of failure of data communication with the microcontroller or the like, a safe operating state of the inverter 3 is set.

If a fault is identified in the inverter arrangement 10' illustrated in FIG. 2, the electric machine 5 can be switched into an active short circuit by closing the three switching devices 3b, 3d, 3f or the three switching devices 3b, 3d, 3f of the inverter 3. In this case, the electric machine 5 has an electrically neutral response, i.e. the electric machine 5 neither draws electric power from the inverter 3 nor outputs electric power to the inverter 3. The electric machine 5 in this case generates a short-circuit torque or braking torque on the shaft.

Alternatively, the inverter 3 can switch the switching devices 3a to 3f off, i.e. set a freewheeling state of the inverter, in which the electric machine 5 generates a speed-dependent field emf by induction.

However, at low speeds, the electric machine 5 can generate a high braking torque, with the result that the drive device 7 is designed to set a freewheeling state in the inverter 3 when the instantaneous speed determined in the evaluation device 6 falls below a predetermined speed threshold value. On the other hand, at high speeds, the high induced field emf can exceed the voltage in the DC voltage intermediate circuit and generate high charge currents on the high-voltage side of the inverter, which can result in damage to the power electronics and the high-voltage energy source 1. In this case, the drive device 7 can be designed to set an active short circuit in the inverter 3 when the instantaneous speed determined in the evaluation device 6 exceeds a predetermined speed threshold value.

Figure 3:
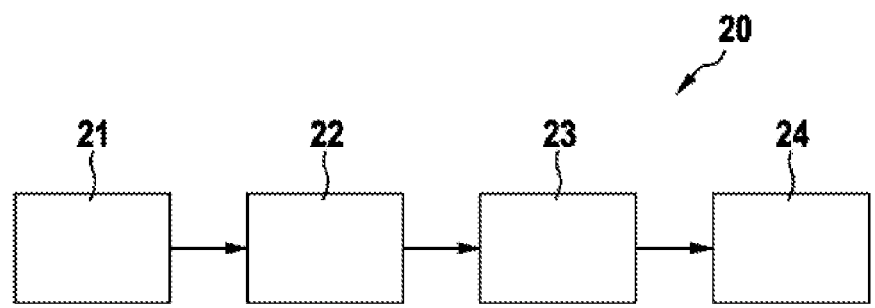
FIG. 3 shows a schematic illustration of a method of operating an inverter in accordance with a further embodiment of the invention.

FIG. 3 shows a schematic illustration of a method for operating an inverter. The method 20 can be used in particular for setting operating states of the inverter 3 in FIGS. 1 and 2, which supplies an n-phase supply voltage to an n-phase electric machine 5 via phase connections 4a, 4b, 4c. The method 20 comprises, in a first step 21, detecting output voltages at the phase connections 4a, 4b, 4c of the inverter 4. In a second step 22, a speed of the electric machine 5 is determined on the basis of the detected output voltages. In steps 23 and 24, driving of switching devices 3a to 3f of the inverter 3 for setting safe operating states can then take place. For example, a freewheeling state can be set when the determined speed is less than a predetermined speed threshold value. Alternatively, an active short circuit can be set when the determined speed is greater than or equal to the predetermined speed threshold value.

The invention claimed is:

1. An operating state circuit for driving an inverter, which supplies an n-phase supply voltage to an n-phase electric machine via a plurality of phase connections, where n≥2, the circuit comprising:
  an evaluation device connected to the inverter, wherein each of the plurality of phase connections are connected to the output voltages of the inverter and the evaluation device is configured to detect output voltages of the inverter at each of the plurality of phase connections and to determine a speed of the electric machine on the basis of the detected output voltages;
  a low-voltage energy supply device connected to the evaluation device, the low-voltage energy supply device configured to supply electrical energy to the evaluation device;
  a drive device coupled to the evaluation device and drives switching devices of the inverter to switch into at least one of the group including a freewheeling state and an active short circuit, in dependence on the determined speed,
  wherein the drive device drives switching devices of the inverter into the freewheeling state when the determined speed is less than a predetermined speed threshold value and drives switching devices of the inverter into the active short circuit when the determined speed is greater than or equal to the predetermined speed threshold value; and
  an energy supply device, which is directly coupled to a DC voltage intermediate circuit, the evaluation device, and the drive device and which is designed to supply electrical energy from the DC voltage intermediate circuit to the evaluation device and the drive device only when the low-voltage energy supply device has failed or another fault state has occurred on the low-voltage side of the inverter.

2. The operating state circuit as claimed in claim 1, wherein the evaluation device is designed to detect the field emf of the electric machine.

3. The operating state circuit as claimed in claim 1, wherein the evaluation device comprises a microcontroller.

4. The operating state circuit as claimed in claim 1, wherein the driving of the switching devices is only implemented when a fault state of the electric machine is detected.

5. An inverter arrangement for supplying an n-phase supply voltage to an n-phase electric machine, where n≥2, the inverter arrangement comprising:
  a DC voltage intermediate circuit, to which a DC voltage is supplied from a high-voltage source;
  an inverter comprising a multiplicity of switching devices, which is connected to the DC voltage intermediate circuit and is designed to provide the n-phase supply voltage at a plurality of phase connections;
  an operating state circuit for driving the inverter, the operating state circuit including
    an evaluation device connected to the inverter, wherein each of the plurality of phase connections are connected to the output voltages of the inverter and the evaluation device is configured to detect output voltages of the inverter at each of the plurality of phase connections and determine a speed of the electric machine on the basis of the detected output voltages,
    a drive device coupled to the evaluation device and drives switching devices of the inverter to switch into at least one of the group including a freewheeling state and an active short circuit, in dependence on the determined speed, and
    a low-voltage energy supply device connected to the evaluation device, the low-voltage energy supply device configured to supply electrical energy to the evaluation device,
    wherein the drive device drives switching devices of the inverter into the freewheeling state when the determined speed is less than a predetermined speed threshold value and drives switching devices of the inverter into the active short circuit when the determined speed is greater than or equal to the predetermined speed threshold value; and
  an energy supply device, which is directly coupled to the DC voltage intermediate circuit, the evaluation device, and the drive device and which is designed to supply electrical energy from the DC voltage intermediate circuit to the evaluation device and the drive device only when the low-voltage energy supply device has failed or another fault state has occurred on the low-voltage side of the inverter.

6. The inverter arrangement as claimed in claim 5, wherein the drive device is designed to switch the switching devices of the inverter into a freewheeling mode for a predetermined time period when the DC voltage in the DC voltage intermediate circuit falls below an intermediate circuit threshold value.

7. A method for setting operating states of an inverter, which supplies an n-phase supply voltage to an n-phase electric machine via a plurality of phase connections, where n≥2, the method comprising:
  supplying, with a low-voltage energy supply device, electrical energy to an evaluation device;
  providing, with an energy supply device, energy to a drive device and the evaluation device only when the low-voltage energy supply device has failed or another fault state has occurred on a low-voltage side of the inverter;
  detecting, with the evaluation device, output voltages at each of the plurality of phase connections of the inverter;
  determining, with the evaluation device, a speed of the electric machine on the basis of the detected output voltages;
  driving switching devices of the inverter for setting a freewheeling state when the determined speed is less than a predetermined speed threshold value; and
  driving switching devices of the inverter for setting an active short circuit when the determined speed is greater than or equal to the predetermined speed threshold value,
  wherein the driving of the switching devices is only implemented when a fault state of the electric machine is detected.

8. The method as claimed in claim 7, further comprising the following steps:
  determining a DC voltage of a DC voltage intermediate circuit, which is connected to the input connections of the inverter; and
  driving switching devices of the inverter for setting the freewheeling state for a predetermined time period when the determined DC voltage is below a predetermined intermediate circuit threshold value.

9. The method as claimed in claim 7, wherein the step of detecting the output voltages comprises detecting the field emf of the electric machine.

\* \* \* \* \*